United States Patent [19]
Kish

[11] Patent Number: 5,472,386
[45] Date of Patent: Dec. 5, 1995

[54] STACKED COMPOUND PLANETARY GEAR TRAIN FOR AN UPGRADED POWERTRAIN SYSTEM FOR A HELICOPTER

[75] Inventor: Jules G. Kish, Milford, Conn.

[73] Assignee: United Technologies Corporation, Hartford, Conn.

[21] Appl. No.: 250,212

[22] Filed: May 26, 1994

[51] Int. Cl.$^6$ .............................. B64C 27/59; F16H 13/08; F16H 1/32
[52] U.S. Cl. ...................... 475/338; 475/903; 416/170 R
[58] Field of Search .................................... 475/331, 338, 475/348, 903; 416/170 R

[56] References Cited

U.S. PATENT DOCUMENTS 3,540,311 11/1970 Chillson .............................. 475/903 X

FOREIGN PATENT DOCUMENTS

| 885210 | 6/1953 | Germany | 416/170 R |
| 404287799 | 10/1992 | Japan | 416/170 R |
| 404306196 | 10/1992 | Japan | 416/170 R |
| 0660430 | 11/1951 | United Kingdom | 475/338 |

*Primary Examiner*—Dirk Wright
*Assistant Examiner*—Khoi Q. Ta
*Attorney, Agent, or Firm*—Terrance J. Radke

[57] ABSTRACT

A stacked compound planetary gear train for an upgraded powertrain system for a helicopter that provides an increased reduction ratio to accommodate the increased horsepower output of the augmented powerplant system while concomitantly providing a baseline RPM output to the main rotor shaft. The stacked compound planetary gear train includes a driving sun gear, a set N of primary planetary pinions, a plurality of secondary planetary pinions, a compound drive shaft supporting each respective primary and secondary planetary pinion combination, a fixed ring gear interacting with the secondary planetary pinions, and a planetary carrier assembly disposed in rotatable combination with the compound drive shafts and operative to provide the output of the stacked compound planetary gear train to the main rotor shaft of the helicopter. The set N of primary planetary pinions includes a plurality N/2 of upper primary planetary pinions and a plurality N/2 of lower primary planetary pinions. The upper and lower primary planetary pinions are disposed in a staggered, biplanar relationship wherein each upper primary planetary pinion overlaps the immediately adjacent lower primary planetary pinions. The stacked compound planetary gear train functions as the third stage reduction gearing in the upgraded powertrain system which includes input modules for receiving the increased horsepower output of an augmented powerplant system. The input modules include first stage reduction gearing for coupling power from the input modules to a main transmission assembly gearing. Second stage reduction gearing of the main transmission assembly couples power to the stacked compound planetary gear train to drive the sun gear thereof.

8 Claims, 6 Drawing Sheets

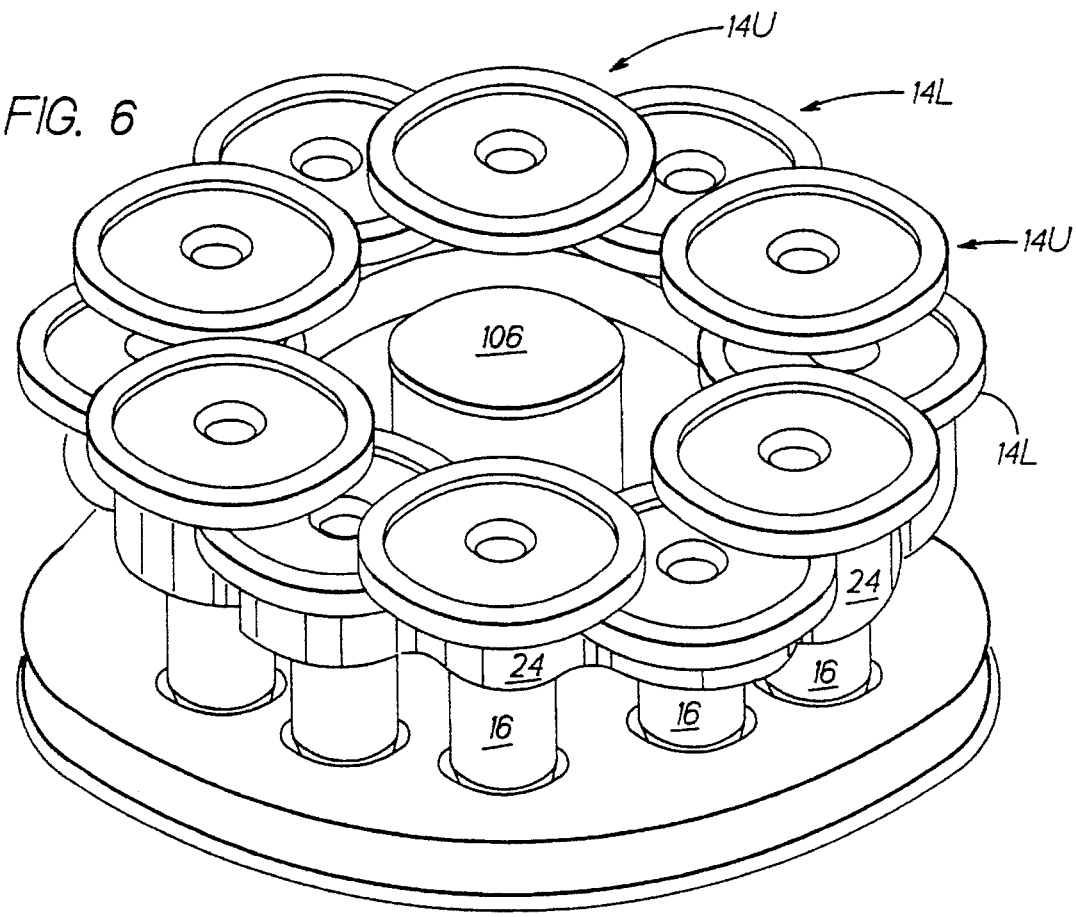

STACKED COMPOUND PLANETARY GEAR TRAIN FOR AN UPGRADED POWERTRAIN SYSTEM FOR A HELICOPTER

FIELD OF THE INVENTION

The present invention is directed to planetary gear trains, and more particularly, to a stacked compound planetary gear train for an upgraded powertrain system for a helicopter, the stacked compound gear train including staggered, biplanar primary planetary pinions which provide an increased reduction ratio to accommodate an augmented powerplant system that provides an increased horsepower output while concomitantly providing a baseline RPM output to the main rotor shaft.

BACKGROUND OF THE INVENTION

Helicopter manufacturers are continually expanding the envelope of helicopter technology so that they can offer the most operationally effective, cost efficient helicopters to their customers. Due to the enormous costs involved in bringing a new helicopter which incorporates the latest state of the art technology to market, the introduction of a new helicopter to the market by a given manufacturer is a relatively unique occasion. In addition to the high costs involved, the delivery cycle for a new helicopter, from conception to the production model, encompasses many years, which further militates against the frequent introduction of new helicopter models.

As an alternative to marketing new helicopters that incorporate state of the art technology, many helicopter manufacturers offer upgrades of basic helicopter production models, i.e., derivative models. Such derivative models may offer new or enhanced operational capabilities, improved performance, increased reliability, and/or lower maintenance requirements by selectively incorporating state of the art technology into the basic helicopter production model to produce the derivative model. By retaining most of the constituent elements of the basic model, delivery costs of the derivative model are generally not significantly greater than the basic production model. The delivery cycle for a derivative model, moreover, may be relatively inconsequential since production derivative models may be segued into the basic model production line in parallel with, or as an alternative to, the basic production model.

The alternative approach, more importantly, may provide an additional benefit to the helicopter manufacturer. The state of the art technology selectively incorporated into the basic helicopter production model to produce the derivative model may also provide the basis for retrofitting existing basic helicopter production models. Retrofits of basic helicopter production models, in addition to providing a new revenue stream for the helicopter manufacturer, allows the customer to upgrade the basic helicopter production model(s) to the more operationally effective derivative model.

One approach to providing a derivative model that is particularly appealing is the incorporation of an augmented engine system, i.e., a powerplant system having a greater horsepower output, in a basic production model. The greater horsepower output of an augmented powerplant system may significantly enhance the operational effectiveness of the derivative model, and may provide the derivative model with an expanded mission capability. In addition, the augmented powerplant system provides the flexibility for incorporating further state of the art technology in the derivative model, e.g., the augmented powerplant system may be configured to provide additional power for the accessory modules.

However, to incorporate an augmented powerplant system in a basic helicopter production model may require a significant redesign of the baseline powertrain system to accommodate the higher torque output of the augmented powerplant system. Such a redesign effort would include such modifications as changes in the reduction ratio(s) of the powertrain system to accommodate the increased torque output of the augmented powerplant system, changes in the airframe/powerplant structural interfaces, relocation of the engine input/gimbal mounting sites, relocation of the power take-off sites for accessory subsystems, relocation of the take-off site for the tail rotor power subsystem, expansion of the structural envelope, i.e., the radial and/or height dimensions, of the main transmission gearbox housing to accommodate configurational changes in the powertrain system, which would perforce, change the mounting sites, i.e., feet, of the gearbox housing. While structural and/or functional redesign of the basic helicopter production model, and in particular, the baseline powertrain system, is one approach to incorporating an augmented powerplant system in helicopter derivative models, such a course of action incurs increased expense in redesign efforts and delays in providing a finished product for marketing efforts.

In addition, such redesign efforts pragmatically eliminate the retrofitting of augmented powerplant systems in the helicopter manufacturer's existing baseline production models. While the cost and time expenditures may be acceptable in manufacturing derivative models for first sales, such cost and time expenditures may prove unacceptable for the retrofit scenario. In addition to the cost and time expenditures required to modify the basic production model to accommodate the augmented powerplant system, it will be appreciated that the owner of the basic production model being retrofitted also incurs additional expenses in the form of lost revenues while the basic production model is out of service for retrofit.

A need exists to provide an upgraded powertrain system having a sufficient degree of commonality with a baseline powertrain system such that the upgraded powertrain system is retrofittable in a basic helicopter production model that incorporates or is retrofitted with an augmented powerplant system. The upgraded powertrain system should be configured for maximal commonality with the baseline powertrain system of existing helicopter production models to minimize redesign modifications and/or to facilitate incorporation/ retrofit in basic helicopter production models to provide derivative models at reasonable costs in a short period of time. The upgraded powertrain system should include a stacked compound planetary gear train having staggered, biplanar primary planetary pinions wherein the stacked compound planetary gear train provides an increased reduction ratio to accommodate the increased horsepower output of the augmented powerplant system while concomitantly providing a baseline RPM output to the main rotor shaft.

SUMMARY OF THE INVENTION

One object of the present invention is to provide an upgraded powertrain system for a helicopter that is retrofittable in a basic helicopter production model that incorporates or is retrofitted with an augmented powerplant system.

Another object of the present invention is to provide a stacked compound planetary gear train for the upgraded powertrain system that includes staggered, biplanar primary planetary pinions to provide an increased reduction ratio to accommodate the increased horsepower output of the augmented powerplant system while concomitantly providing a baseline RPM output to the main rotor shaft.

Yet a further object of the present invention is to provide an upgraded powertrain system that includes a stacked compound planetary gear train having staggered, biplanar primary planetary pinions that has a sufficient degree of commonality with a baseline powertrain system of a basic helicopter production model such that the upgraded powertrain system is retrofittable in the basic helicopter production model that incorporates or is retrofitted with an augmented powerplant system.

One more object of the present invention is to provide a stacked compound planetary gear for a baseline powertrain system that is design optimized to have a configuration that is compatible with the geometric constraints of structural and functional envelope of the baseline powertrain system, including the mounting feet of the gearbox housing in the radial dimension, the main bevel gear mesh in the vertical dimension, and helicopter cabin ceiling in the vertical dimension.

These and other objects of the present invention are achieved by a stacked compound planetary gear train according to the present invention which functions as the third stage reduction gearing of an upgraded powertrain system to provide an increased reduction ratio that accommodates the increased horsepower output of the augmented powerplant system while concomitantly providing a baseline RPM. The stacked compound planetary gear train includes a driving sun gear, a set N of primary planetary pinions, a plurality of secondary planetary pinions, a compound drive shaft supporting each respective primary and secondary planetary pinion combination, a fixed ring gear interacting with the secondary planetary pinions, and a planetary carrier assembly disposed in rotatable combination with the compound drive shafts and operative to couple the output of the stacked compound planetary gear train to a driven member. The set N of primary planetary pinions includes a plurality N/2 of upper primary planetary pinions and a plurality N/2 of lower primary planetary pinions. The upper and lower primary planetary pinions are disposed in a staggered, biplanar relationship wherein each upper primary planetary pinion overlaps the immediately adjacent lower primary planetary pinions.

The stacked compound planetary gear train according to the present invention functions as the third stage reduction gearing in the upgraded powertrain system which includes input modules for receiving the increased horsepower output of an augmented powerplant system. The input modules include first stage reduction gearing for coupling power from the input modules to a main transmission assembly. Second stage reduction gearing of the main transmission assembly couples power to the stacked compound planetary gear train to drive the sun gear thereof.

BRIEF DESCRIPTION OF THE DRAWINGS

A more complete understanding of the present invention and the attendant advantages and features thereof may be had by reference to the following detailed description of the invention when considered in conjunction with the accompanying drawings wherein:

FIG. 6 is a perspective view illustrating features of the stacked compound planetary gear train according to the present invention.

BEST MODES FOR CARRYING OUT THE INVENTION

Figure 1:
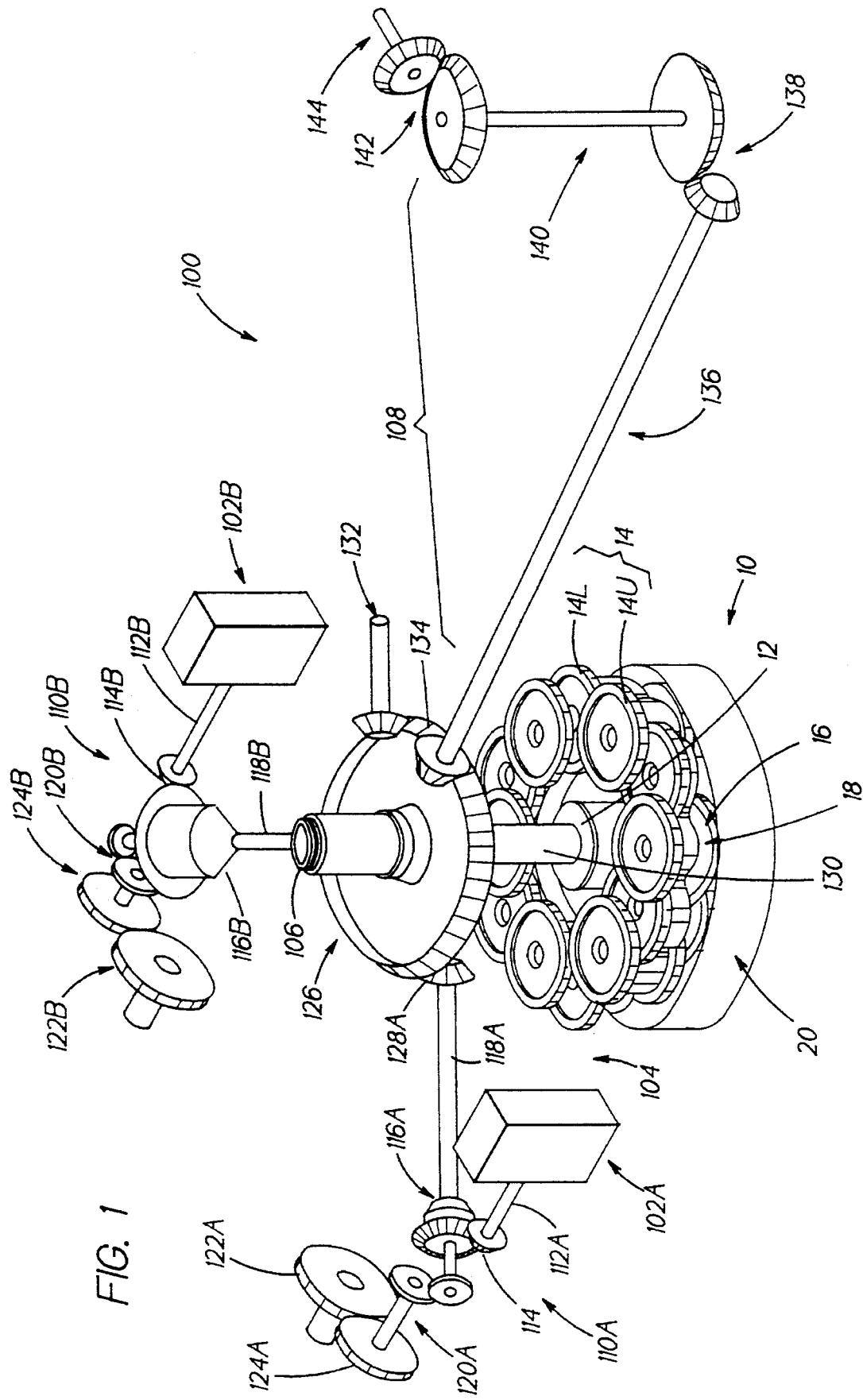
FIG. 1 is a perspective view illustrating an upgraded powertrain system for a helicopter that includes a stacked compound planetary gear train according to the present invention.

Referring now to the drawings wherein like reference characters identify corresponding or similar elements throughout the several views, FIG. 1 illustrates an exemplary embodiment of an upgraded powertrain system 100 for a helicopter that includes a stacked compound planetary gear train 10 according to the present invention. The powertrain system 100 described herein is "upgraded" in the sense that the powertrain system 100 has a structural and functional configuration that is optimized for commonality with the baseline powertrain system of existing helicopter production models while concomitantly accommodating an augmented powerplant system. The upgraded powertrain system 100 described hereinbelow is configured for use in helicopter production models wherein the powerplant system comprises two demountable power packages such that the production models may be readily upgraded to derivative models by the incorporation/retrofit of augmented power packages, i.e., higher horsepower output.

A demountable power package is installed on each side of the main transmission assembly, each demountable power package including an engine, a pneumatic starter, a drive shaft assembly, engine mounts, a tailpipe assembly, fuel and lubrication lines, and a wiring harness. The primary function of the upgraded powertrain system 100 is to couple the combined power generated by the engines of the augmented power packages 102A, 102B (illustrated as blocks in FIG. 1 for purposes of simplicity) to a main transmission assembly 104, a main rotor shaft 106, and a tail rotor subsystem 108. A secondary function of the upgraded powertrain system 100 is to provide a mechanical drive for electrical and hydraulic accessories.

While the specific structural and functional features of the stacked compound planetary gear train 10 according to the present invention are illustrated and described herein as a constituent element of the upgraded powertrain system 100 for a helicopter, one skilled in the art will appreciate that the disclosure of such a specific application is not intended to be limiting. Within the scope of the appended claims, the stacked compound planetary gear train 10 according to the present invention may be practiced in applications other than as specifically described herein.

The main transmission assembly 104 comprises a corresponding input module 110A, 110B for each augmented power package 102A, 102B, and a main module 126. Each input module 110A, 110B is connected to the corresponding augmented power package 102A, 102B by means of an engine drive shaft assembly 112A, 112B, and includes first stage reduction gearing 114A, 114B (input and output bevel gears as illustrated) for each engine power path, an overrunning clutch 116A, 116B for each power path, and an output quill shaft 118A, 118B for each power path. Each input module 110A, 110B further includes an accessory module take-off 120A, 120B that provides power for respective hydraulic pumps 122A, 122B and generators 124A, 124B.

The main module 126 comprises second stage reduction gearing 128 (only the second stage reduction gearing 128A is illustrated in FIG. 1—the second stage reduction gearing pinion for the B power path is blocked by the main rotor shaft 106), a drive shaft 130, and the stacked compound planetary gear train 10 according to the present invention, which functions as the third stage reduction gearing for the upgraded powertrain system 100. The second stage reduction gearing 128 includes driver bevel pinions for the A, B power paths and a main bevel gear that is driven by the A, B driver bevel pinions. The driven main bevel gear, in turn, couples power to the drive shaft 130 which provides the power input to the stacked compound planetary gear train 10 according to the present invention. The main module 126 also includes a hydraulic drive takeoff 132 and a take-off 134 for the tail rotor subsystem 108 which further includes a primary tail rotor drive shaft 136, an intermediate gearbox 138, a secondary tail rotor pylon drive shaft 140, a tail rotor gearbox 142, and a tail rotor drive shaft 144 which is operative to couple power to a tail rotor hub assembly including tail rotor blades (not illustrated) that provides anti-torque for the helicopter.

Figure 1A:
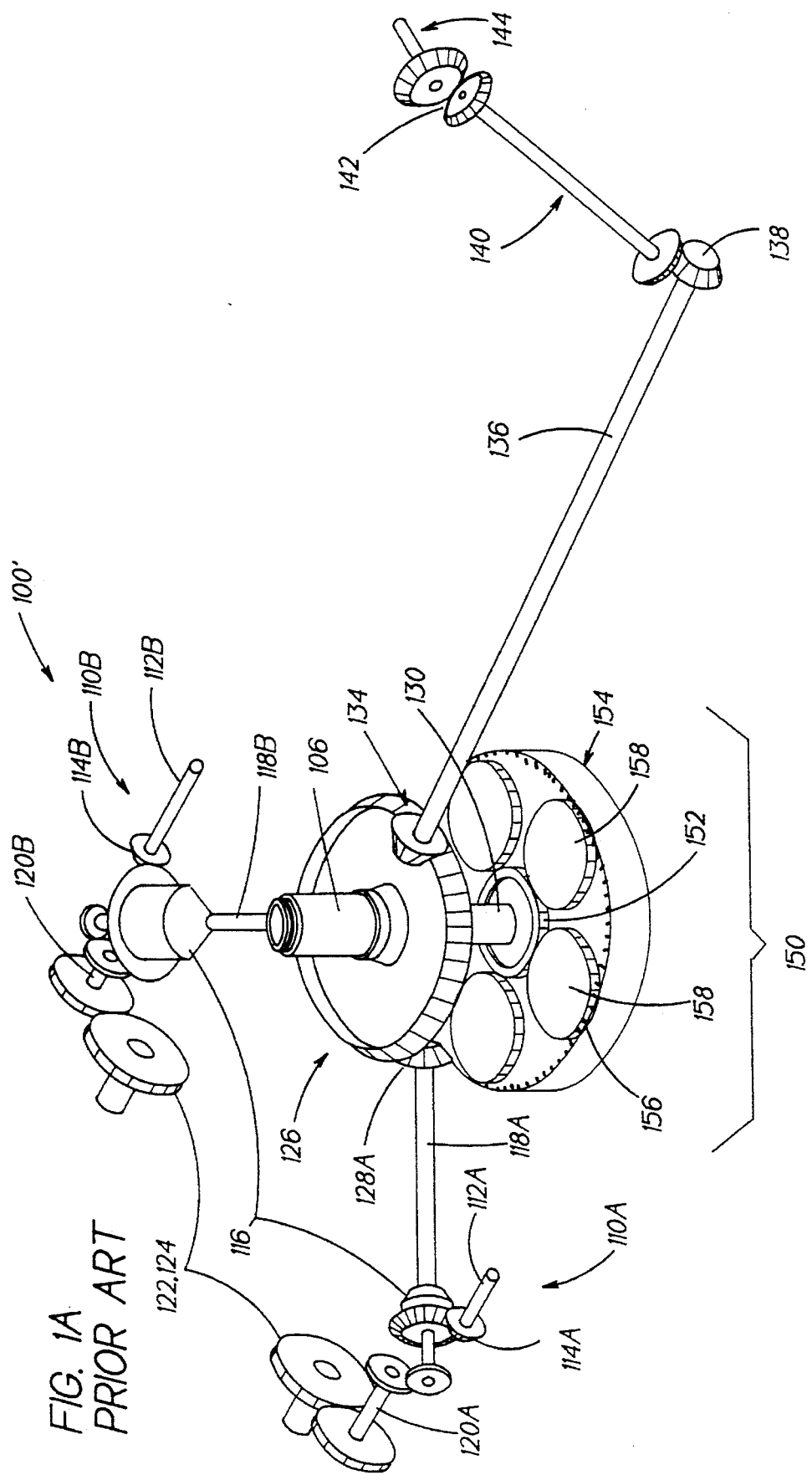
FIG. 1A is a perspective view of the baseline powertrain system incorporated in UH-60 production model helicopters.

FIG. 1A is an exemplary illustration of a baseline powertrain system 100' of BLACK HAWK® and SEAHAWK® helicopters (BLACK HAWK and SEAHAWK are registered trademarks of the Sikorsky Aircraft Division of United Technologies Corporation) manufactured by Sikorsky Aircraft. The baseline powertrain system 100' has a structural and functional configuration that is generally similar to the upgraded powertrain system 100 described in the preceding paragraphs, except for the third stage reduction gearing. A simple planetary gear train 150 functions as the third stage reduction gearing for the baseline powertrain system 100' The simple planetary gear train 150 comprises a sun gear 152 (operative to couple power from the drive shaft 130 into the gear train 150), a fixed ring gear 154, and a planetary carrier output assembly 156 that includes a plurality of planetary pinions 158 which simultaneously rotate about their own axes and revolve around the sun gear 152. The planetary carrier output assembly 156 is operative to couple the power of the third stage reduction gearing to the main rotor shaft 106 at a baseline RPM.

The upgraded powertrain system 100 described hereinabove, which includes the stacked compound planetary gear train 10 according to the present invention, is configured for use in the S-92™ HELIBUS™ helicopter (S-92 and HELIBUS are trademarks of the Sikorsky Aircraft Division of United Technologies Corporation) being developed by Sikorsky Aircraft. The structural and functional configuration of the stacked compound planetary gear train 10 of the upgraded powertrain system 100 was driven primarily by two interrelated design objectives. The first design objective was that the configuration of the upgraded powertrain system 100 be retrofittable in variants of the UH-60 production model helicopters manufactured by Sikorsky Aircraft, i.e., as a structural and functional replacement for the baseline powertrain system 100' described hereinabove. That is, the first design objective required that the configuration of the upgraded powertrain system 100 of the S-92™ HELIBUS™ helicopter be maximized for commonality with the baseline powertrain systems 100' of BLACK HAWK® and SEAHAWK® production model helicopters.

Several design constraints were imposed upon the upgraded powertrain system 100 as a result of the commonality design objective. These design constraints included, inter alia, a design requirement that the main transmission gearbox housing of the S-92™ powertrain system 100 have pragmatically the same structural envelope as the gearbox housings incorporated in BLACK HAWK® and SEAHAWK® production model helicopters (more specifically, commonality in radial dimensions to ensure equivalence in location of the mounting feet of the main transmission gearbox housings; height dimensions are not as critical such that growth in the height dimensions of the S-92™ gearbox housing is acceptable if required), a design requirement for commonality in airframe interfaces for the power packages, a design requirement for commonality in engine input/ gimbal locations, a design requirement for commonality in accessory take-off locations, a design requirement for commonality in the tail rotor subsystem take-off location, and a design requirement for commonality in the location of the sump waterline with no cabin intrusion permissible.

The second design objective was that the upgraded powertrain system 100 be configured to accommodate augmented powerplant systems, i.e., power packages that provide an increased horsepower output. Each of the augmented power packages 102A, 102B of the S-92™ HELIBUS™ helicopter has a shaft output of about 2085 HP for a total shaft output of 4170 HP (as compared to the power package of the baseline SEAHAWK® production model helicopter which has a shaft output for each power package of about 1700 HP for a total shaft output of 3400 HP). Of the total shaft output of 4170 HP provided by the power packages 102A, 102B, about 3750 HP is available to the stacked compound planetary gear train 10 due to power losses through the tail rotor take-off 134, the accessory module take-offs 120A, 120B, the hydraulic drive take-off 132, friction losses, etc., (as compared to the power available to the simple planetary system of the baseline SEAHAWK® powertrain system of 3060 HP). The upgraded powertrain system 100, and in particular, the stacked compound planetary gear train 10 according to the present invention, is design optimized to effectively couple the increased horsepower output provided by the augmented power packages 102A, 102B to the main rotor shaft 106 and the tail rotor subsystem 108 while concomitantly providing an output RPM to the main rotor shaft 106 that is equivalent to the baseline RPM output of the baseline powertrain system 100'. By design optimizing the upgraded powertrain system 100 to satisfy the foregoing design objectives and constraints, the upgraded powertrain system 100 described herein, which incorporates the stacked compound planetary gear train 10 according to the present invention, can be retrofitted in BLACK HAWK® and SEAHAWK® production model helicopters that have been augmented with higher performance power packages, i.e., derivative models.

To accommodate the increased horsepower output of the augmented power packages 102A, 102B, the reduction ratio of each input module 110A, 110B, i.e., the first stage reduction gearing 114A, 114B, of the upgraded powertrain system 100 is decreased, i.e., has a smaller magnitude than the magnitude of the reduction ratio of the baseline input modules of the SEAHAWK® production model helicopter (a magnitude of 81/29 versus a magnitude of 80/22), so that the output torque of each input module 110A, 110B at 2085 HP equivalent to the output torque of the baseline input modules of the SEAHAWK® production model helicopter at 1700 HP. The RPM output of each input module 110A, 110B of the upgraded powertrain system 100 is about 7483 rpm (versus an RPM output of about 5747 rpm for the baseline input modules of the SEAHAWK® production model helicopter).

The required RPM output of the main rotor shaft 106 of the upgraded powertrain system 100 is about 257 RPM (for equivalence with the baseline RPM output of the baseline SEAHAWK® powertrain system 100'). The reduction ratio of the second stage reduction gearing 128 of the powertrain system 100 is pragmatically the same as the second stage reduction gearing of the baseline SEAHAWK® powertrain system 100' since the loads are the same. Therefore, to compensate for the loss in reduction ratio in the input modules 110A, 110B of the upgraded powertrain system 100, an increased reduction ratio is required in the third stage reduction gearing of the main module 126 of the upgraded powertrain system 100. For the embodiment exemplarily described herein, the reduction ratio required by the third stage reduction gearing of the main module 126 is about 6.27:1 (versus about 4.68:1 in the baseline SEAHAWK® simple planetary gear train).

As noted hereinabove, the third stage reduction gearing of the baseline BLACK HAWK® and SEAHAWK® powertrain systems 100' comprises a simple planetary gear system 150. The configuration of the third stage reduction gearing for the upgraded powertrain system 100, in addition to being subject to the design constraints enumerated hereinabove, is subject to further design constraints based upon the configuration of the simple planetary gear system 150 of the baseline powertrain system 100'. In particular, the diameter of the fixed ring gear for the third stage reduction gearing of the upgraded powertrain system 100 must be the same or less than the diameter of the fixed ring gear 154 of the simple planetary gear system 150 of the baseline BLACK HAWK® and SEAHAWK® powertrain systems 100'. For the described embodiment, the ring gear diameter must be equal to or less than about 65.385 cm (25.742 inches). Further, the diameter of the sun gear for the upgraded powertrain system 100 should be the same or may be greater than the diameter of the sun gear 152 of the simple planetary gear system 150 of the baseline BLACK HAWK® and SEAHAWK® powertrain systems 100' For the described embodiment, the sun gear diameter should be equal to or greater than about 17.780 cm (7.000 in). An increase in the height dimension of the structural envelope associated with the third stage reduction gearing, i.e., the height dimension of the gearbox housing, is permissible if necessary, but is not a preferred design modification. However, the bottom of the structural envelope cannot intrude into the cabin area.

An engineering analysis of a single stage simple planetary gear train of the type described hereinabove and illustrated in FIG. 1A showed that a simple planetary gear train would not meet the foregoing design constraints while concomitantly accommodating the increased output power of about 3750 HP provided by the augmented power packages 102A, 102B. As a consequence, planetary gear train designs having two stages were examined for suitability as the third stage reduction gearing in the upgraded powertrain system 100.

For a two stage planetary gear train providing an overall reduction ratio of approximately 6.27:1, the reduction ratio of each stage was pragmatically limited to about 2.5:1 because of degradation in the bearing system life. The baseline SEAHAWK® production model main transmission assembly has a bearing system life of about 3490 hours. The bearing system lifes of the respective stages of an analytical two stage planetary gear train, in contrast, were determined to be about 710 hours and 640 hours, respectively. As an examination of these numbers reveals, this is a decrease in bearing system life by at least a factor of five. Clearly, such a degradation in bearing system life would be unacceptable in a derivative of the powertrain system. Since the largest diameter bearing system that is consonant with the design constraints described above, i.e., the radial dimension of the gearbox housing envelope, was examined, the issue of bearing system life led to the examination of alternative designs for the third stage reduction gearing of the upgraded powertrain system 100.

Compound planetary gear trains comprise a single stage of planetary gearing in which there are two planetary pinions in a carrier output assembly. The compound planetary may include none, one, or two sun gears, and none, one, or two ring gears. Depending upon the arrangement of the constituent members comprising the compound planetary gear train, i.e., which member is the driving input and which is the driven output, a wide choice of embodiments with diverse reduction ratios is possible. Two further constraints were imposed in evaluating different compound planetary gear train configurations as an alternative for the two stage planetary system. The overall reduction ratio must be approximately 6.27:1, and the direction of rotation of the output member must be the same as the direction of rotation of the input member.

Figure 2A:
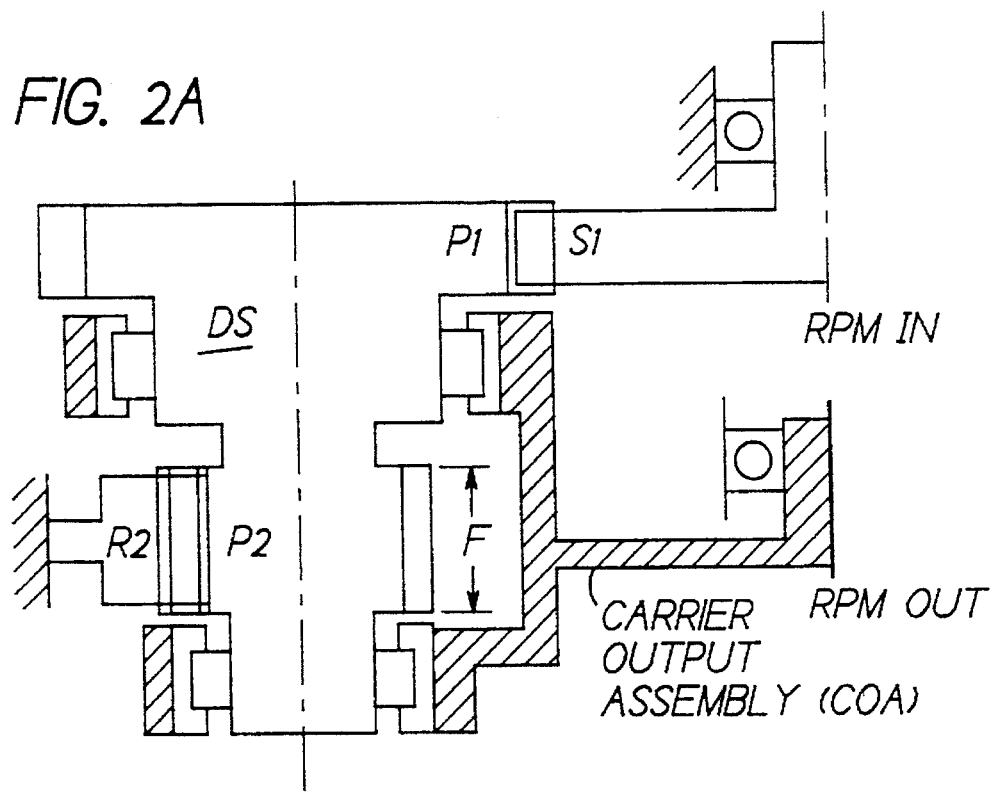
FIG. 2A is a schematic representation of a compound planetary gear train.
Figure 2B:
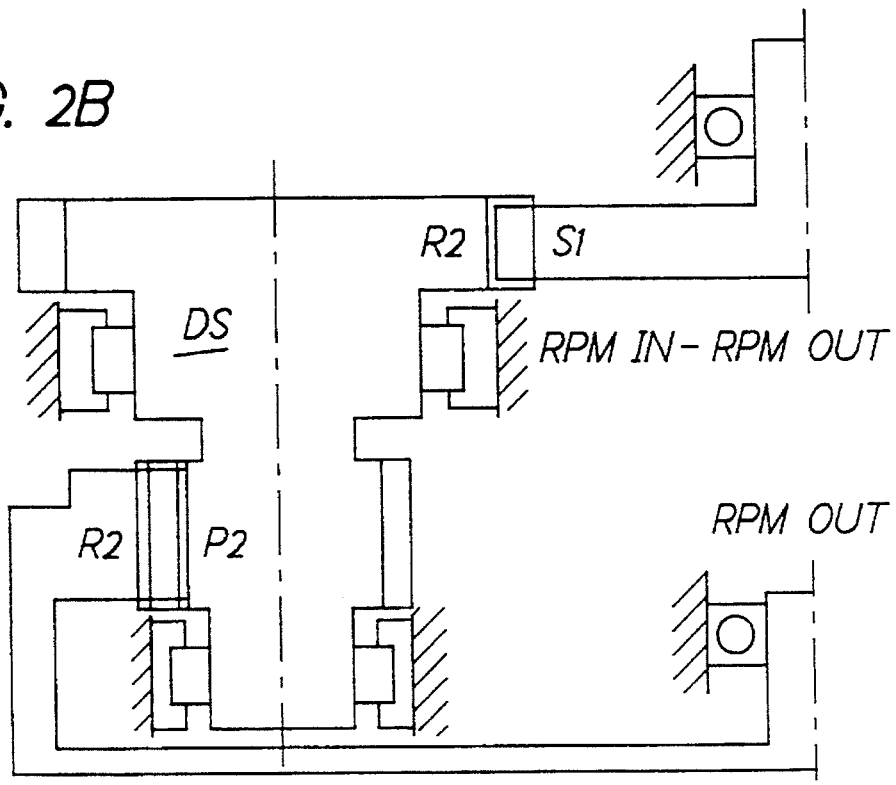
FIG. 2B is a schematic representation of a fixed center system equivalent to the compound planetary gear train of FIG. 2A.

After an examination of various compound planetary gear train configurations, one configuration was selected for numerical evaluation of possible reduction ratio characteristics. This compound planetary gear train configuration comprised a single sun gear (versus two for a two stage planetary), a single ring gear (versus two for a two stage planetary), a single carrier output assembly (versus two for a two stage planetary), and twenty-four planetary pinions (versus twenty-three pinions for a two stage planetary). FIGS. 2A, 2B illustrate the evaluated configuration of the compound planetary gear train wherein the sun gear S1 provides the input to the primary planetary pinion P1, the ring gear R2 provides a reaction to the secondary planetary pinion P2, and the output is provided by means of the carrier output assembly COA. Each primary planetary pinion P1 and the corresponding secondary planetary pinion P2 are supported by a common drive shaft DS The reduction ratio for the compound planetary gear train illustrated in FIGS. 2A, 2B is derived as follows:

Equating the RPM of P1/P2 from the sun gear S1 and the ring gear R2 gives $$(rpm_{in} - rpm_{out})\left[\frac{-S1}{P1}\right] = (-rpm_{out})\left[\frac{R2}{P2}\right] \qquad \text{Equation (1)}$$

Dividing both sides of Equation (1) by $rpm_{out}$ and noting that $rpm_{in}/rpm_{out}$ is equal to the reduction ratio, RR gives $$(RR - 1)\left[\frac{S1}{P1}\right] = \left[\frac{R2}{P2}\right] \qquad \text{Equation (2)}$$

Multiplying each side of Equation (2) by P1/S1 and adding 1 results in $$RR = 1 + \frac{P1R2}{S1P2} \qquad \text{Equation (3)}$$

If the ratio of the sun gear diameter $D_S$ to the primary planetary pinion gear diameter $D_p$ is defined as the "Ratio", the geometry of the evaluated configuration can be approximately related to the number of pinions by evaluating the position at which the tips of adjacent pinions just abut each other as follows:

$$\text{Ratio} = \frac{D_s}{D_p} \approx \frac{1.1}{\sin\left[\frac{\pi}{\text{no. pin}}\right]} - 1 \qquad \text{Equation (4)}$$

The ratio of sun gear diameter $D_s$ to primary planetary pinion gear diameter $D_p$ versus the number of planetary pinions is set forth in Table I using Equation (4) hereinabove.

TABLE I

| Number of Pinions | $D_s/D_p$ | $D_p/D_s$ |
|---|---|---|
| 4 | 0.56 | 1.79 |
| 5 | 0.87 | 1.15 |
| 6 | 1.20 | 0.83 |
| 7 | 1.54 | 0.65 |
| 8 | 1.87 | 0.53 |
| 9 | 2.22 | 0.45 |
| 10 | 2.56 | 0.39 |
| 11 | 2.90 | 0.34 |
| 12 | 3.25 | 0.31 |
| 13 | 3.60 | 0.28 |
| 14 | 3.94 | 0.25 |

An examination of Table I shows that, as the number of primary planetary pinions increases, the ratio $D_S/D_P$ increases. Conversely, the ratio of $D_P/D_S$ decreases with an increasing number of primary planetary pinions. Thus, if it is desired to use a large number of primary planetary pinions in the compound planetary gear train (for reduced weight and increased load carrying capacity), the pragmatic effects of the ratio $D_P/D_S$ may be evaluated using Equation 4 hereinabove. For example, the ratio $D_P/D_S$ is about 0.31 if twelve primary planetary pinions are utilized in the compound planetary gear train. To determine the effect twelve primary planetary pinions have on the sizing of the ring gear R2 and the secondary pinion P2 of a compound planetary gear train that provides a reduction ratio RR having a value of 6.27:1, the values RR equal to 6.27 and $D_p/D_s$ equal to 0.31 (for P1/S1) are substituted in Equation 4, which is then solved for the value of R2/P2. The value of R2/P2 under these conditions is about 17.0.

The required value of about 17.0 for the ratio R2/P2 is too large for a practical design for a compound planetary gear train inasmuch as the secondary planetary pinions would be too small and the loads experienced thereby would be too large. Furthermore, the face width F (see, e.g., FIG. 2A) for the secondary planetary pinion P2 becomes very large for the required diameter of the secondary planetary pinion P2, the ratio of face width to the diameter of the secondary planetary pinion P2 having a value greater than five. One skilled in the art will appreciate that the ratio of the face width to the diameter (F/D) for a particular gear is conventionally kept to a value of 1.0 or less to minimize the negative consequences of gear cocking that arise with values of F/D much greater than 1.0. From the foregoing analysis, it was evident to the inventor that a conventional compound planetary gear train that was configured to provide a reduction ratio RR of about 6.27:1 and which included twelve primary planetary pinions is not practical under the design constraints described hereinabove. A similar analysis shows that a conventional compound planetary gear train configured to provide a reduction ratio RR having a value of 6.27:1 and which included ten primary planetary pinions is likewise not practical under the design constraints described hereinabove.

To provide a compound planetary gear train that would meet the foregoing design constraints, the inventor developed the stacked compound planetary gear train 10 illustrated generally in FIG. 1 and in further detail in FIGS. 3–6. The stacked compound planetary gear train 10 according to the present invention is structurally and functionally configured to operate as the third stage reduction gearing of the upgraded powertrain system 100'. The gear train 10 provides the reduction ratio required by the upgraded powertrain system 100, e.g., for the described embodiment 6.27:1, to accommodate augmented engine modules 102A, 102B while concomitantly providing a baseline RPM output. The stacked compound planetary gear train 10 according to the present invention meets the design constraints set forth hereinabove.

Figure 3:
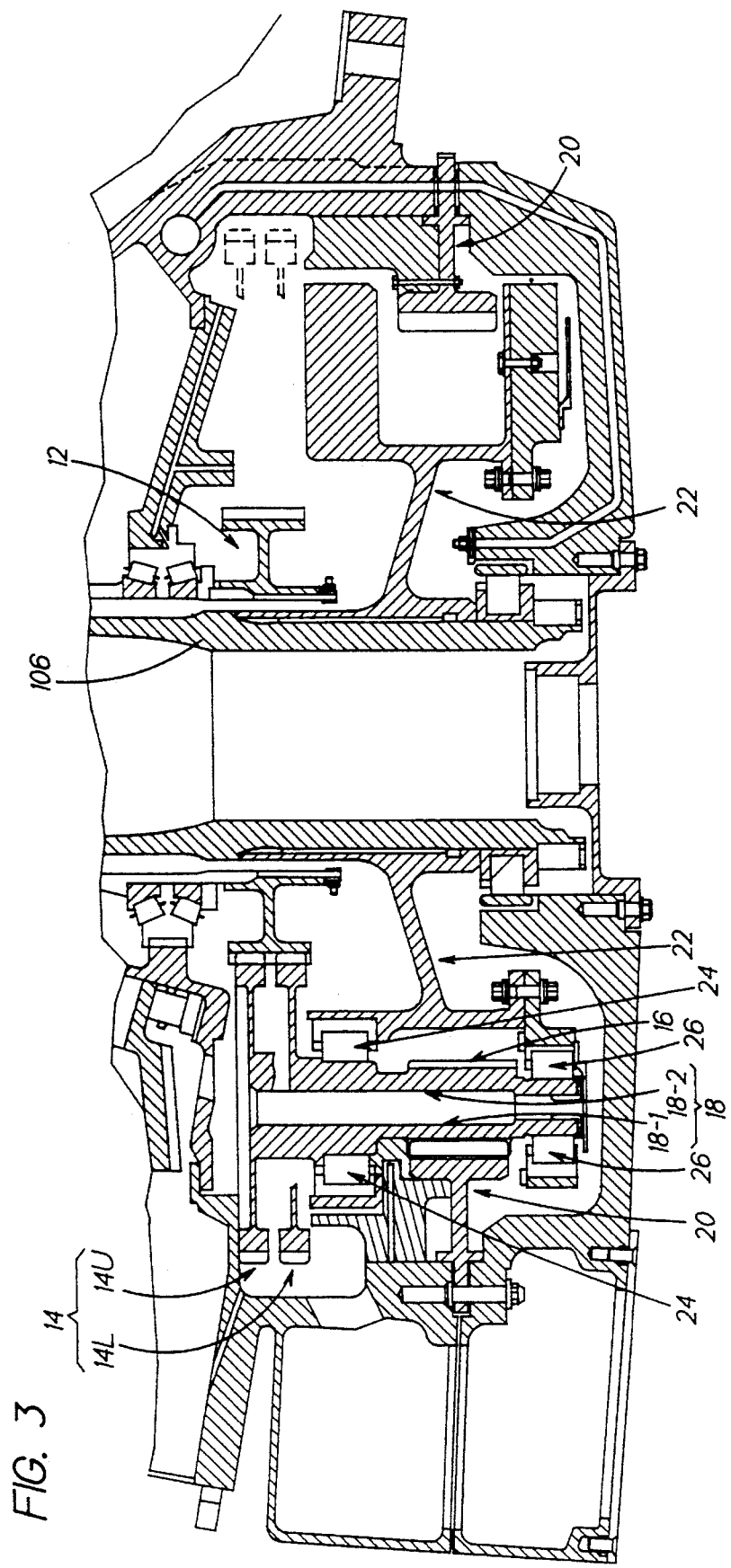
FIG. 3 is a cross-sectional view of the stacked compound planetary gear train according to the present invention.

With reference to FIG. 3, the stacked compound planetary gear train 10 according to the present invention comprises a driving sun gear 12, a set N of primary planetary pinions 14 interacting with the sun gear 12 wherein N defines the total number of primary planetary pinions 14 of the gear train 10, a plurality N of secondary planetary pinions 16, compound gear shafts 18 supporting each corresponding primary and secondary planetary pinions 14, 16, a fixed ring gear 20 (e.g., in rigid combination with the transmission gearbox housing), and a common planetary carrier assembly 22. As illustrated in FIG. 3, the secondary pinions 16 interact with the fixed ring gear 20, and the common planetary carrier assembly 22 is supported in rotatable combination with the compound gear shafts 18 by means of upper and lower bearing assemblies 24, 26. The common planetary carrier assembly 22 is operative to couple the output of the stacked compound planetary gear train 10 to the main rotor shaft 106, i.e., increased torque and the baseline RPM output.

In the stacked pinion concept, the ratio S1/P1 is selected so that the primary planetary pinions 14 comprising the set N are disposed in a staggered, biplanar relationship. One requirement of the stacked pinion concept is that the number N defining the set of primary planetary pinions 14 must be an even number to achieve equally spacing of the primary planetary pinions 14 in the staggered, biplanar configuration. Accordingly, the set N of primary planetary pinions 14 of the stacked compound planetary gear train 10 comprises a plurality N/2 of "upper" primary planetary pinions 14U and a plurality N/2 of "lower" primary planetary pinions 14L, as exemplarily illustrated in FIGS. 4–6. The upper primary planetary pinions 14U define a first plane of rotation 30 and the lower primary planetary pinions 14L define a second plane of rotation 32 (see FIG. 5). An examination of FIGS. 4–6 shows that the upper and lower primary planetary pinions 14U, 14L are equally spaced in the respective rotational planes 30, 32, and that each upper primary planetary pinion 14U symmetrically overlaps the immediately adjacent lower primary planetary pinions 14L.

Figure 4:
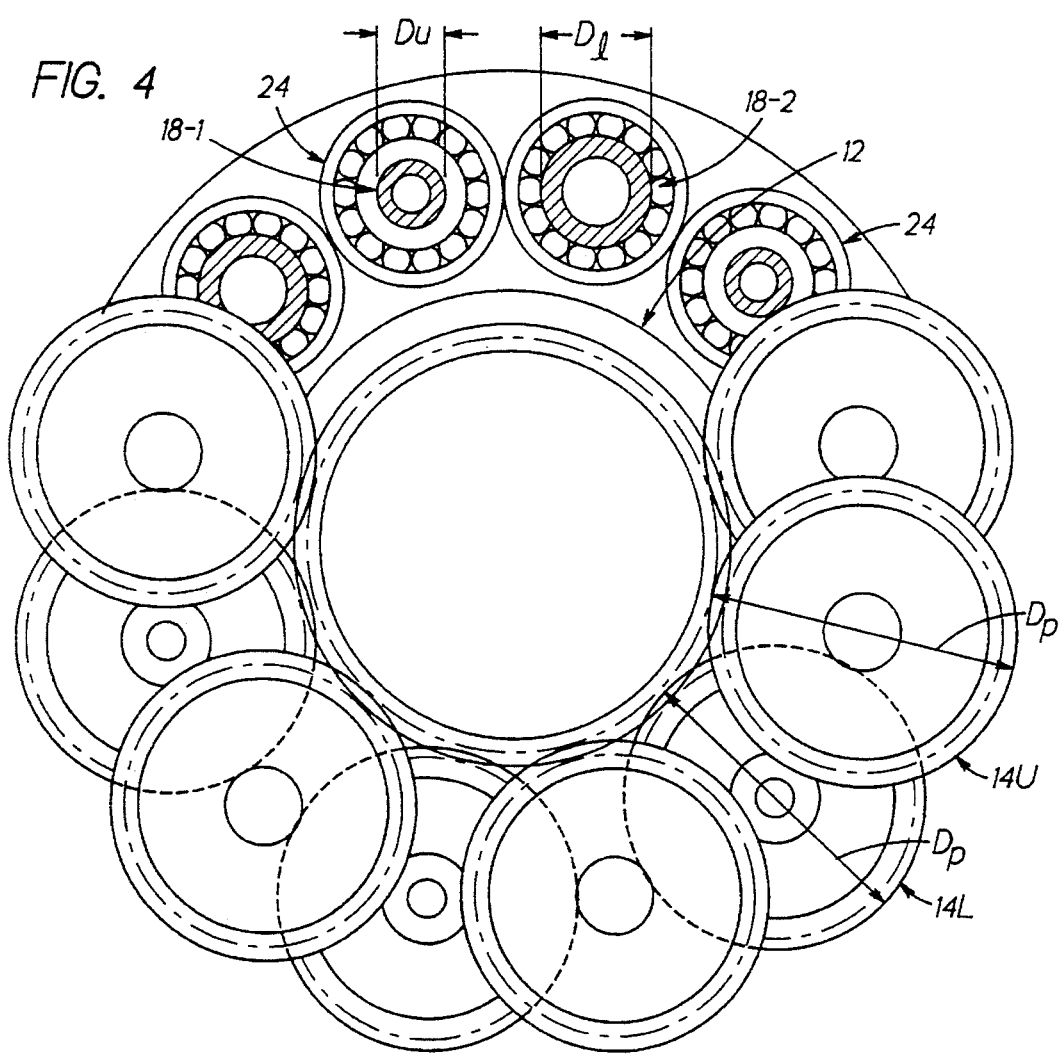
FIG. 4 is a partial top plan view of the stacked compound planetary gear train of FIG. 2 illustrating the stacking scheme of the primary planetary pinion gears of the stacked compound planetary gear train of FIG. 3.

With reference to FIG. 4, each primary planetary pinion 14U, 14L is defined by a gear face diameter $D_p$ (based upon the selected ratio S1/P1). The diameter $D_u$ (see FIGS. 4–5) of the segment of the compound drive shaft 18 supporting each upper primary planetary pinion 14U is a critical dimension in the stacked pinion concept. The diameter $D_u$ of the supporting segment is selected so that the gear face periphery of each of the immediately adjacent lower primary planetary pinions 14L, which is defined by the outside diameter of $D_p$, has a minimal clearance with respect to the compound drive shaft 18 supporting the respective overlapping upper primary planetary pinion 14U (see FIG. 5 wherein reference numerals 14L-1 and 14L-2 identify immediately adjacent lower primary planetary pinions and reference numeral 18-1 identifies the segment of the compound drive shaft supporting the overlapping upper primary planetary pinions 14U-1 ).

Figure 5:
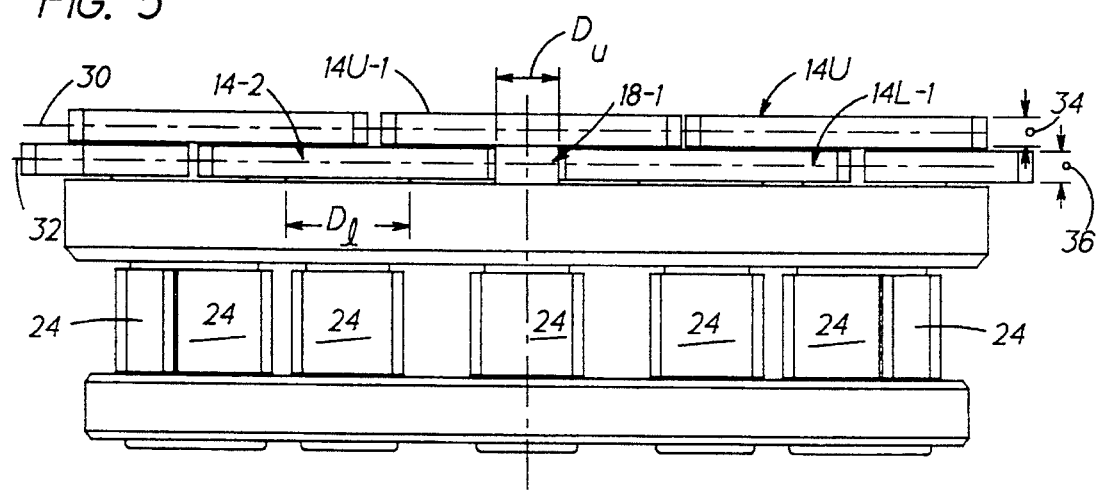
FIG. 5 is a side plan view of the stacked compound planetary gear train of FIG. 4.

Also illustrated in FIGS. 4–5 is the diameter $D_l$ of the segment of the compound drive shaft 18-2 supporting each lower primary planetary pinion 14L. Due to the variations in diameter $D_u$, $D_l$ of the supporting segments of the compound drive shafts 18-1, 18-2, the stacked compound planetary gear train 10 according to the present invention includes a plurality N/2 of first compound drive shafts 18-1 and a plurality N/2 of second compound drive shafts 18-2 for supporting the upper and lower primary planetary pinions 14U, 14L, respectively. The segments of the first and second compound drive shafts 18-1, 18-2 supporting the secondary planetary pinions 16 are identical in configuration inasmuch as the secondary planetary pinions 16 are identical in configuration. Preferably, each upper primary planetary pinion 14U, compound drive shaft 18-1, secondary planetary pinion 16 combination and each lower primary planetary pinion 14L, compound drive shaft 18-2, secondary planetary pinion 16 combination is fabricated, e.g., machined, as an integral component.

An examination of FIG. 3 shows that the upper and lower primary planetary pinions 14U, 14L define separate and distinct interaction zones with the sun gear 12 due to the biplanar relationship therebetween. With reference to FIG. 5, the upper primary planetary pinions 14U interact with the sun gear 12 in an interaction zone 34 while the lower primary planetary pinions 14L interact with the sun gear 12 in an interaction zone 36. In contrast, in a conventional compound planetary gear train all the primary planetary pinions would interact with the sun gear in a common interaction zone.

For the embodiment of the stacked compound planetary gear train 10 according to the present invention described herein, a significantly greater ratio $D_P/D_S$ is achievable as compared to a conventional compound planetary gear. For the embodiment of the stacked compound planetary gear train 10 described herein wherein the number of primary planetary pinions 14 is twelve, the ratio of $D_P/D_S$ has a value of 53/79=0.67, compared to a value of 0.31 for the ratio $D_P/D_S$ of the conventional compound planetary gear train described hereinabove. Based upon the value of 0.67 for the ratio $D_P/D_S$ of the stacked compound planetary gear train 10 according to the present invention, equation (4) may be utilized to determine the value of the ratio $R_2/P_2$, which equals 8.1. The ratio $R_2/P_2$ having a value of 8.1 represents an achievable practical design for the configuration of the secondary planetary pinions and a fixed ring gear of a compound planetary gear train. Such a practical design is embodied in the stacked compound planetary gear train 10 described and depicted herein.

An examination of FIGS. 4, 6 shows that the permissible outer diameter of the upper bearing assemblies 24 is limited due to interference with the outer diameters of immediately adjacent upper bearing assemblies 24. Even with such a limitation, bearing system lifes of about 2100 hours and about 3000 hour are attainable for embodiments of the stacked compound planetary gear train 10 having twelve and ten primary planetary pinions 14, respectively.

The embodiment of the stacked compound planetary gear train 10 described and illustrated herein comprises twelve primary planetary pinions 14, of which six are upper primary planetary pinions 14U and six are lower primary planetary pinions 14L, disposed in a staggered, biplanar relationship. One skilled in the art will appreciate that, depending upon the particular design constraints for a stacked compound planetary gear train 10 according to the present invention, the set N of primary planetary pinions 14 may comprise an even number N of primary planetary pinions 14 less than or greater than twelve.

A variety of modifications and variations of the present invention as described hereinabove are possible in light of the above teachings. It is therefore to be understood that, within the scope of the appended claims, the present invention may be practiced otherwise than as specifically described herein.

What is claimed is:

1. A stacked compound planetary gear train, comprising:
   a driving sun gear;
   a set N of primary planetary pinions interacting with said sun gear wherein N defines the number of primary planetary pinions in said set, said set N including
   a first plurality N/2 of upper primary planetary pinions, and
   a second plurality N/2 of lower primary planetary pinions,
   said upper and lower primary planetary pinions being disposed in a staggered, biplanar relationship;
   a plurality N of secondary planetary pinions;
   a compound drive shaft supporting a respective primary planetary pinion and a secondary planetary pinion;
   a fixed ring gear interacting with said plurality of secondary planetary pinions, and
   a planetary carrier assembly disposed in rotatable combination with said compound drive shafts and operative to provide the output of said stacked compound planetary gear train.

2. The stacked compound planetary gear train of claim 1 wherein N is an even number.

3. The stacked compound planetary gear train of claim 2 wherein N is equal to twelve.

4. The stacked compound planetary gear train of claim 1 further comprising a plurality of upper bearing assemblies and a plurality of lower bearing assemblies, said pluralities of upper and lower bearing assemblies in combination supporting said planetary carrier assembly in rotatable combination with said compound drive shafts.

5. The stacked compound planetary gear train of claim 1 wherein each compound drive shaft supporting one of said plurality N/2 of upper primary planetary pinions has a predetermined diameter such that there is a minimum clearance between each said compound drive shaft and the peripheries of immediately adjacent lower primary planetary pinions.

6. A powertrain system for a helicopter having a main rotor shaft, comprising:
   input module means for receiving power from an augmented powerplant system, said input module means including first stage reduction gearing;
   a main transmission assembly including second stage reduction gearing mechanically coupled in combination with said first stage reduction gearing for receiving power therefrom and a drive shaft mechanically coupled in combination with said second stage reduction gearing for receiving power therefrom;

a sun gear mechanically coupled in combination with said drive shaft and driven thereby wherein said sun gear acts as a driver;

a set N of primary planetary pinions interacting with said sun gear wherein N defines the number of primary planetary pinions in said set, said set N including a first plurality N/2 of upper primary planetary pinions, and a second plurality N/2 of lower primary planetary pinions, said upper and lower primary planetary pinions being disposed in a staggered, biplanar relationship;

a plurality N of secondary planetary pinions;

a compound drive shaft supporting a respective primary planetary pinion and a secondary planetary pinion;

a fixed ring gear interacting with said plurality of secondary planetary pinions, and a planetary carrier assembly disposed in rotatable combination with said compound drive shafts and operative to provide the output of said stacked compound planetary gear train to the main rotor shaft of the helicopter.

7. The powertrain system of claim 6 wherein N is an even number.

8. The powertrain system of claim 7 wherein N is equal to twelve.

* * * * *